United States Patent [19]

Ryd

[11] Patent Number: 5,755,424
[45] Date of Patent: May 26, 1998

[54] HIGH-PRESSURE VALVE

[76] Inventor: Jan Ryd, Företagsvägen 2, Ronneby S-372 38, Sweden

[21] Appl. No.: 640,788

[22] PCT Filed: Dec. 12, 1994

[86] PCT No.: PCT/SE94/01193

§ 371 Date: Aug. 27, 1996

§ 102(e) Date: Aug. 27, 1996

[87] PCT Pub. No.: WO95/17623

PCT Pub. Date: Jun. 29, 1995

[30] Foreign Application Priority Data

Dec. 22, 1993 [SE] Sweden ................... 9304251

[51] Int. Cl.⁶ ............................................ F16K 31/143
[52] U.S. Cl. ............................ 251/63; 251/14; 251/60
[58] Field of Search .............................. 251/60, 62, 63, 251/63.5, 903, 14

[56] References Cited

U.S. PATENT DOCUMENTS

| | | |
|---|---|---|
| 2,479,454 | 8/1949 | Annin . |
| 3,734,455 | 5/1973 | Natho et al. .............. 251/14 X |
| 3,765,642 | 10/1973 | Nelson . |
| 4,169,405 | 10/1979 | Tsunemoto et al. ............ 251/14 X |
| 4,343,327 | 8/1982 | Hallstein . |
| 4,617,992 | 10/1986 | Abel ............................ 251/14 X |
| 4,815,692 | 3/1989 | Loiseau et al. ............... 251/14 |
| 4,898,210 | 2/1990 | Nitta ............................ 251/14 X |

FOREIGN PATENT DOCUMENTS

| | | | |
|---|---|---|---|
| 65154 | 9/1949 | Netherlands ............... 251/60 |
| 349646 | 10/1972 | Sweden . |

Primary Examiner—Kevin Lee
Attorney, Agent, or Firm—Cowan, Liebowitz & Latman, P.C.

[57] ABSTRACT

A high-pressure valve comprising a piston whose upper surface is acted upon intermittently by a medium, such as air, to control vertical movement of the piston, the valve including a connection of the piston to a needle valve. The needle valve coacts with a valve seat and communicates with the inlet to a liquid delivery line through which liquid is delivered to the needle valve via a high-pressure pump and leaves through a nozzle orifice. Also provided is a rotatable device for mechanically forcing the piston to a lower position in which the needle valve is brought into abutment with the valve seat.

4 Claims, 2 Drawing Sheets

HIGH-PRESSURE VALVE

The present invention relates to a valve which includes a piston whose upper surface is normally acted upon intermittently by a medium, for instance air, for the purpose of controlling vertical movement of the piston, wherein the piston is connected by connecting means to a needle valve which can coact with a valve seating and which communicates with the inlet of a liquid supply line which delivers liquid to the needle valve via a high-pressure pump, wherein the liquid leaves the needle valve through a nozzle orifice and wherein means are provided for blocking said orifice.

A valve of this kind is normally referred to as a high-pressure valve and is used for so-called water-jet cutting of materials, for instance, wherein a liquid, normally water, is delivered from a reservoir to a high-pressure pump which builds-up a liquid pressure of 3,000–4,000 bars, whereafter the highly pressurized liquid is released to a delivery line whose outlet end discharges into a valve of the afore-described kind. This high-pressure jet is released through a nozzle for the purpose of performing cutting work. As before mentioned, a processor-controlled medium is caused to act upon the upper surface of the piston in a predetermined manner, and the needle valve moves in accordance with the piston movement. A high pressure on the upper side of the piston will bring the needle valve into sealing abutment with a valve seat, whereas the pressure acting on the needle valve will cause the needle to leave the valve seat when the pressure on the piston is reduced.

High-pressure working processes of this kind require continuous system maintenance, among other things. It is necessary to undertake different servicing procedures while the system is in operation. A usual procedure in the maintenance routine involves the replacement of worn nozzles. In other instances, it may be necessary to exchange a nozzle in order to carry out a different kind of work.

In cases such as these it is, of course, extremely important from a safety aspect that the valve is unable to release the pressure that prevails in the valve. It is therefore necessary to know for certain that the needle valve is in full sealing abutment with its valve seat.

In this regard, there are safety regulations which state that the valve shall be blocked against unintentional opening of the valve. It is known to protect such systems against unintentional opening of the valve with the aid of a mechanical liquid flow closure device fitted to the delivery line extending from the high pressure pump. This closure device is thus fitted outside the valve arrangement. In view of the fact that a water-jet cutting system will typically include from four to ten valves, it will be apparent that a) a closure valve of the known kind will greatly increase the costs of the system;

b) the installation of such a closure valve will be both time-consuming and expensive; and that c) a system which includes a known closure valve will be space-consuming.

Despite the safety precautions taken in such systems, the workmen involved still remain uneasy as to whether or not the pressure that has already been built-up in the valve and which remains latent even when the aforesaid mechanical closure device has been activated will be caused to be discharged through the nozzle as a result of some other technical fault. One possible fault in this regard is a short breakdown in electrical supply or a short drop in voltage, causing the medium acting on the upper side of the piston, via a pump or compressor, to decrease abruptly and instantaneously, thereby enabling the needle valve to be activated in a valve opening direction and therewith subject workmen and personnel to the effect of the high-pressure liquid and the consequences that follow. The high-pressure pump should not be stopped, for different reasons.

The present invention has evolved against this background, and the object of the invention is to provide means which will fully prevent unintentional release of the high pressure prevailing in the valve.

DESCRIPTION OF THE BACKGROUND ART

Water-jet cutting under the aforementioned high pressures is a relatively young technique. The inventor of the inventive valve has had long experience in this technique, but has been unable to find any form of arrangement which will solve the aforesaid problem. High-pressure valves which are equipped with different kinds of safety devices are available commercially; see, for instance, U.S. Pat. Nos. 3,681,173, 2,785,698, 2,925,243, 4,343,327 and 2,479,454. These documents do not lead one of normal skill in this art to a simple but reliable solution to the aforesaid problem.

DISCLOSURE OF THE INVENTION

The present invention provides a valve of the kind defined in the introduction which is an improvement on known valves with regard to the problems aforementioned. The characteristic features of the inventive valve are set forth in the characterizing clause of claim 1.

Figure 1:
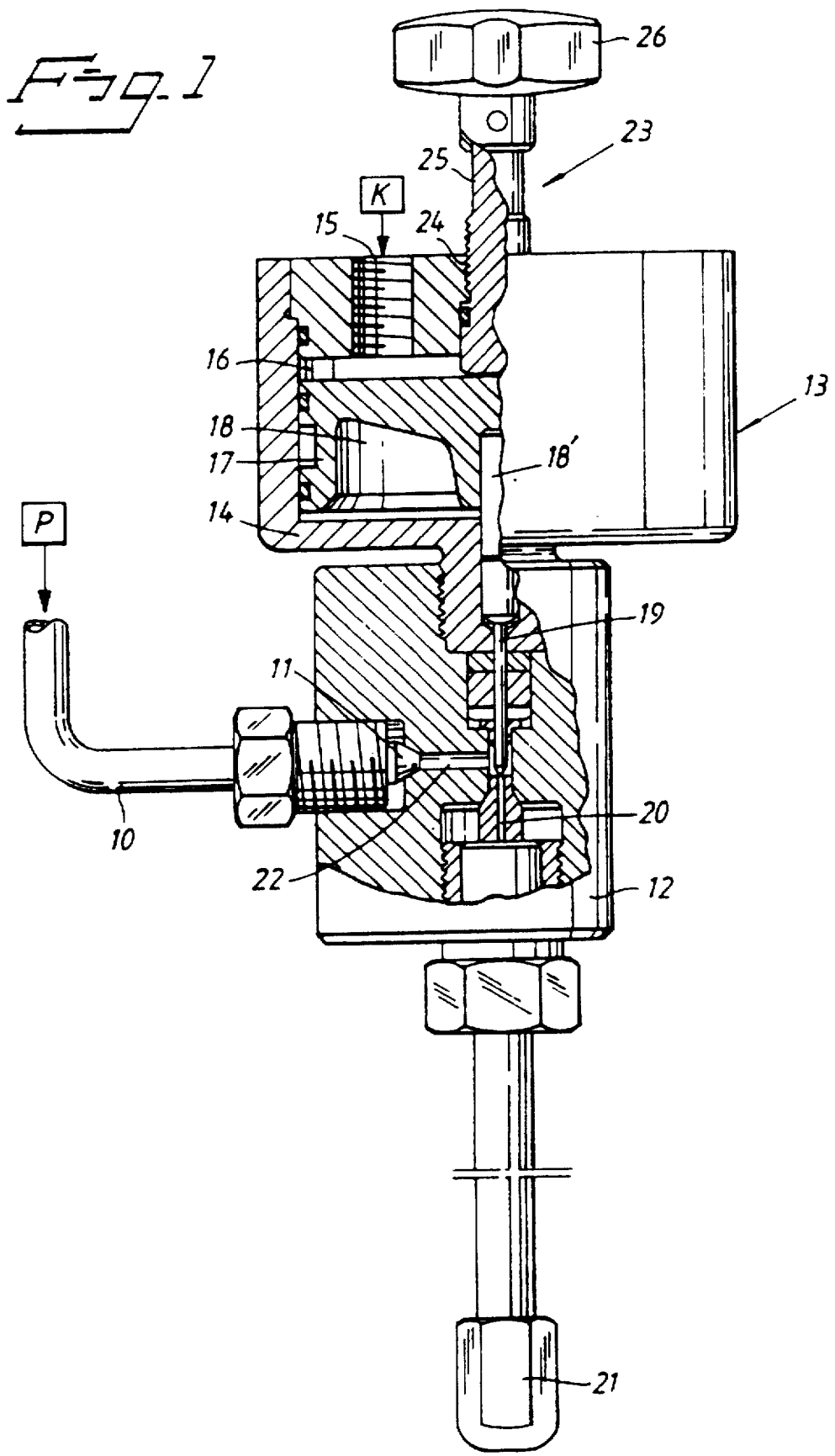
FIG. 1 illustrates a high-pressure valve comprising a needle valve according to a preferred embodiment of the invention, the needle valve being shown in an open position.
Figure 2:
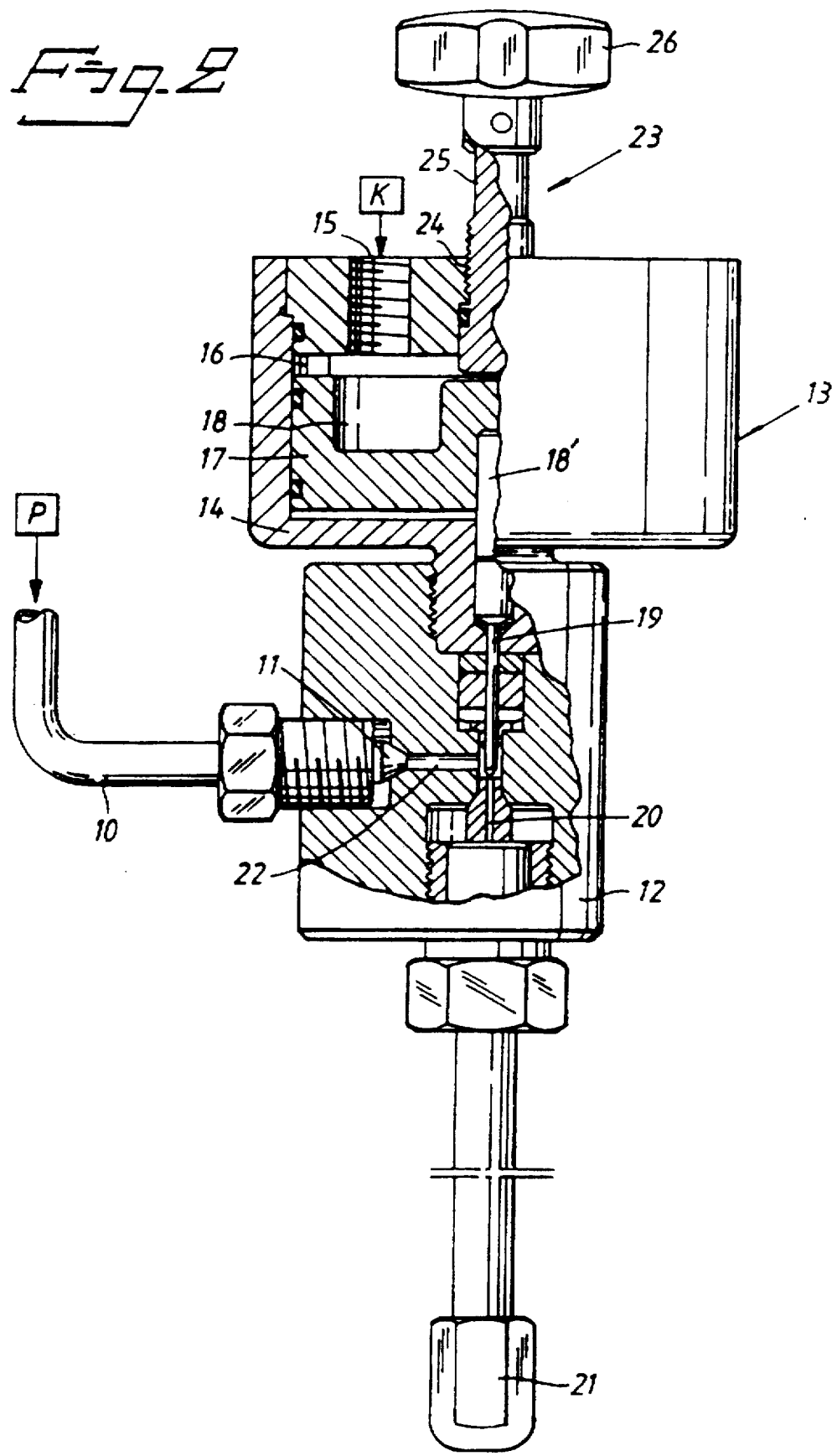
FIG. 2 illustrates a high-pressure valve identical to the valve depicted in FIG. 1 with the exception of having the piston recess formed in its upper side.

The invention will now be described in more detail with reference to other features and also with reference to the accompanying drawings, of which FIGS. 1 and 2 are axial, partially sectional views of an inventive valve.

A liquid source (not shown), normally a water source, delivers liquid to a known high-pressure pump P, in which a high or very high pressure is built-up, typically a pressure of 3,000–4,000 bars. The pressurized liquid is fed into a pipe 10 which is connected by a pressure-tight connection 11 to a part 12 of a valve housing, generally referenced 13, whose upper side includes an upwardly open opening 15 for sealing connection to a medium source, normally a compressor, indicated schematically by the box K. The opening 15 in the cylinder housing 14 communicates with a space 16 which is closed in all other respects and in which a piston 17 can be moved vertically in response to the pressure acting on the piston 17 through the medium of the source K. In the case of the FIG. 2 embodiment, the piston 17 includes a mass-reducing recess 18, although it will be understood that the upper surface of the piston 17 may also be flat. If reasons are found for reducing the mass of the piston in some other way, a corresponding recess may be formed in the bottom side of the piston 17 (FIG. 1). The piston 17 is thus able to move vertically to a limited extent within the piston chamber 16, and the upper and lower inner walls of the valve housing 14 may be said, in principle, to form the upper and lower piston abutment surfaces.

A valve of this kind intended for water-jet cutting work will operate in accordance with a predetermined program, such that the piston will move intermittently up and down in response to the pressure acting on the upper surface of the piston 17. The piston 17 is connected with a pressure pin 18' which carries a conical needle valve 19. The needle valve 19 is intended to move into and out of a valve seating 20 in response to vertical movement of the piston 17, said valve seat 20 opening into a nozzle 21 via a delivery channel. The valve is fitted with sealing rings in the form of O-rings 18".

As will be seen from the drawing, the high-pressure pipe, or line, 10 is connected to a passageway 22 which opens into the region of the bottom end of the needle valve 19. The needle valve 19 seals against the valve seat 20 at a given pressure on the upper side of the piston 17. When the pressure acting on the upper side of the piston 17 is reduced, the liquid pressure acting through the passageway 22 will lift the needle valve, and therewith also the piston 17, therewith enabling the liquid to flow out through the nozzle 21.

In accordance with the invention, the improved valve 13 is provided with a closure device generally referenced 23. In this regard, the upper side of the cylinder 14 is provided with an at least partially screw-threaded bore 24 which is intended to receive an at least partially screw-threaded body 25, whose upper end is firmly connected to a knob 26 or some like turning device. The bottom free and flat end of the body 25 can be brought into abutment with the upper side of the piston 17 by turning the knob 26. Continued rotation of the knob 26 will force the piston 17 downwards into abutment with the lower inner wall of the cylinder housing 14, and therewith also press the needle valve 19 into pressure-sealing abutment with the valve seat 20.

Since vertical movement of the piston 17 is at most 3–5 mm, it will be understood that the valve can be closed mechanically very quickly and simply by the closure device 25, 26, therewith providing optimal security with regard to the pressure that has built-up in the valve housing 13. Provided that the needle valve is in positive sealing engagement with the valve seat 29, it is possible to make a nozzle change without risk of personal injury as a result of the high pressure within the valve housing 13 being released unintentionally.

The valve illustrated in FIGS. 1 and 2 are identical with the exception that the piston in FIG. 2 has the recess 18 provided on its upper side, while the valve in FIG. 1 has a corresponding, mass-reducing recess provided on the bottom side of the piston 17. The embodiment shown in FIG. 1 is preferred.

I claim:

1. A valve comprising a piston having an upper side, a bottom side and a piston chamber, the upper side of which piston is acted upon intermittently by a medium, such as air or liquid, to control vertical movement of the piston, the valve includes connecting means which connect the piston to a needle valve having a valve housing, which coacts with a valve seat and which communicates with a liquid delivery line through which liquid is delivered to the needle valve via a high-pressure pump and leaves through a nozzle orifice, wherein there is provided means for blocking the nozzle orifice, characterized in that the means for blocking the nozzle orifice is comprised of a rotatable device (25, 26) having a top part and a bottom part, which can be activated externally of the valve; in that rotation of the device (25, 26) in one direction will bring the bottom part of the device (25, 26) into pressure engagement with the upper side of the piston (17) such as to force the bottom side of the piston into abutment with the bottom of the piston chamber and thereby force the needle valve (19) into liquid-tight abutment with the valve seat (20).

2. A valve according to claim 1, characterized in that the rotatable device (25, 26) is in screw-thread engagement with the upper side of the valve housing.

3. A valve according to claim 1, characterized in that the medium which acts from above the piston (17) is delivered by a processor-controlled compressor (K); and in that the medium acts on the upper side of the piston.

4. A valve according to claim 1, characterized in that the upper side of the piston (17) is flat and that the bottom side of the piston is provided with a mass-reducing recess.

* * * * *